US009042349B1

(12) United States Patent
Oroskar et al.

(10) Patent No.: US 9,042,349 B1
(45) Date of Patent: *May 26, 2015

(54) ALLOCATION OF WIRELESS RESOURCES BASED ON MEDIA CODEC

(75) Inventors: Siddharth S. Oroskar, Overland Park, KS (US); Srini Penugonda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/483,920

(22) Filed: May 30, 2012

(51) Int. Cl.
*H04W 72/04* (2009.01)
*H04W 36/00* (2009.01)
*H04W 72/14* (2009.01)
*H04W 36/02* (2009.01)
*H04W 72/10* (2009.01)
*H04W 8/26* (2009.01)
*H04W 72/00* (2009.01)
*H04W 28/24* (2009.01)

(52) U.S. Cl.
CPC .............. *H04W 36/00* (2013.01); *H04W 72/14* (2013.01); *H04W 36/02* (2013.01); *H04W 72/04* (2013.01); *H04W 28/24* (2013.01); *H04W 72/10* (2013.01); *H04W 8/26* (2013.01); *H04W 72/048* (2013.01); *H04W 72/005* (2013.01); *H04W 72/042* (2013.01); *H04W 72/0406* (2013.01)

(58) Field of Classification Search
CPC ....... H04W 8/26; H04W 28/24; H04W 36/00; H04W 36/02; H04W 72/10; H04W 72/14; H04W 72/005; H04W 72/042; H04W 72/048
See application file for complete search history.

(56) References Cited

U.S. PATENT DOCUMENTS

| 6,798,786 | B1 | 9/2004 | Lo et al. |
| 7,693,526 | B2 | 4/2010 | Qian et al. |
| 7,768,998 | B1 | 8/2010 | Everson et al. |
| 7,873,074 | B1 | 1/2011 | Boland |
| 2003/0063569 | A1* | 4/2003 | Kalliokulju et al. .......... 370/252 |
| 2004/0008627 | A1 | 1/2004 | Garg et al. |
| 2005/0261899 | A1 | 11/2005 | Brueck et al. |
| 2005/0288018 | A1 | 12/2005 | Huang et al. |
| 2006/0174015 | A1 | 8/2006 | Arauz-Rosado |
| 2007/0043558 | A1* | 2/2007 | Schwarz et al. .............. 704/207 |
| 2007/0047707 | A1 | 3/2007 | Mayer et al. |
| 2009/0209300 | A1* | 8/2009 | Furbeck ........................ 455/574 |
| 2009/0227277 | A1 | 9/2009 | Gupta et al. |

(Continued)

OTHER PUBLICATIONS

"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).

(Continued)

*Primary Examiner* — Jianye Wu
*Assistant Examiner* — Jeff Banthrongsack

(57) ABSTRACT

In response to receiving a first resource request from a first wireless communication device (WCD) and a second resource request from a second WCD, a radio access network (RAN) may determine that the first WCD and second WCD are contending for a resource of a wireless coverage area that is defined by the RAN. The RAN may further determine that the first WCD supports a first media codec, and that the second WCD supports a second media codec but does not support the first media codec. The RAN may compare the first media codec to the second media codec, and based on a result of this comparison, may allocate the resource to the first WCD.

18 Claims, 5 Drawing Sheets

(56) References Cited

U.S. PATENT DOCUMENTS

2009/0303983 A1    12/2009   Kennedy
2009/0322582 A1*   12/2009   Baugh et al. .................. 341/176

OTHER PUBLICATIONS

CouthIT, "EVRC-A," 1 page, May 18, 2012 (www.couthit.com/codec-evrc.asp).

CouthIT, "EVRC-B," 1 page, May 18, 2012 (www.couthit.com/codec-evrc-b.asp).

CouthIT, "EVRC-NW," 2 pages, May 18, 2012 (www.couthit.com/codec-evrc-nw.asp).

CouthIT, "EVRC-C, EVRC-WB," 2 pages, May 18, 2012 (www.couthit.com/codec-evrc-wb.asp).

Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).

Office Action for U.S. Appl. No. 13/598,042 mailed Oct. 25, 2012 (35 pages).

Office Action for U.S. Appl. No. 13/483,933 mailed Oct. 7, 2013 (25 pages).

\* cited by examiner

ALLOCATION OF WIRELESS RESOURCES BASED ON MEDIA CODEC

BACKGROUND

Wireless service providers typically design their wireless networks to comprise a number of partially-overlapping wireless coverage areas. A radio access network (RAN) may allocate resources from these wireless coverage areas to wireless communication devices (WCDs) so that these WCDs can communicate using the resources. The resources may include, for example, frequencies, code division multiple access (CDMA) codes, time division multiple access (TDMA) timeslots, and so on.

Over time, a wireless service provider may incrementally deploy new media codecs. Some new media codecs may be of a higher quality than older media codecs. However, not all WCDs using the wireless service provider's network may support the new media codecs.

OVERVIEW

WCDs may support various types of media codecs. These media codecs may define how media content (e.g., voice, music, still images, and/or video) are encoded and decoded. Different media codecs may have different characteristics. For instance, a voice codec used by a WCD might encode and decode digital voice at a rate of 1-15 kilobits per second. However, to achieve these bit rates, some of the information present in an input analog voice signal (e.g., high-frequency spectral components) may be lost when digitized. Thus, media codec design can be a tradeoff between achieving a low bit rate for a particular type of media (which is desirable to conserve network and storage capacity) and the user-perceived quality of media produced by the media codec.

In general, there may be a roughly linear relationship between media codec bit rate and the media quality that the media codec produces at that bit rate. For example, a voice codec operating at 9.6 kilobits per second is likely to produce better quality voice than a voice codec operating at 4.8 kilobits per second. However, as media codec technologies advance, new media codecs may be introduced that are capable of supporting equal or better media quality at a lower bit rate. Thus, in some cases, a voice codec that operates at 8.5 kilobits per second may produce better voice quality than another voice codec operating at 9.6 kilobits per second.

Wireless networks allocate various types of resources to WCDs in order for the WCDs to communicate. These resources may include various aspects of frequencies, time slots, and/or code-division multiple access (CDMA) codes, etc. Since wireless spectrum is limited, it may benefit wireless network operators to allocate wireless resources judiciously. Therefore, when determining how to allocate wireless resources to WCDs, a RAN may be configured to preferentially allocate wireless resources to WCDs that are capable of using more efficient media codecs over WCDs that are not.

Accordingly, in a first embodiment, a RAN may receive a first resource request from a first WCD. The first WCD may support a first media codec. The RAN may also receive a second resource request from a second WCD. The second WCD may support a second media codec and but might not support the first media codec. Possibly in response to receiving the first resource request and the second resource request, the RAN may determine that the first WCD and second WCD are contending for a resource of a particular wireless coverage area defined by the RAN. Possibly in response to determining that the first WCD and second WCD are contending for the resource, the RAN may compare the first media codec to the second media codec. Based on a result of the comparison of the first media codec to the second media codec, the RAN may allocate the resource to the first WCD.

This comparison may take various forms. For instance, the RAN may compare the first media codec to the second media codec to determine that the first media codec is capable of producing higher voice quality voice calls than the second media codec. As part of this comparison, the RAN may also determine the first media codec is capable of producing the higher voice quality voice calls at a lower bit rate than the second media codec produces lower quality voice calls. Thus, the RAN may allocate the resource to the first WCD so that the capacity of the wireless coverage area is used more efficiently.

A second example embodiment may include a non-transitory computer-readable storage medium, having stored thereon program instructions that, upon execution by a RAN device, cause the RAN device to perform operations in accordance with the first example embodiment.

A third example embodiment may include a RAN device, comprising at least a processor and data storage. The data storage may contain program instructions that, upon execution by the processor, operate in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
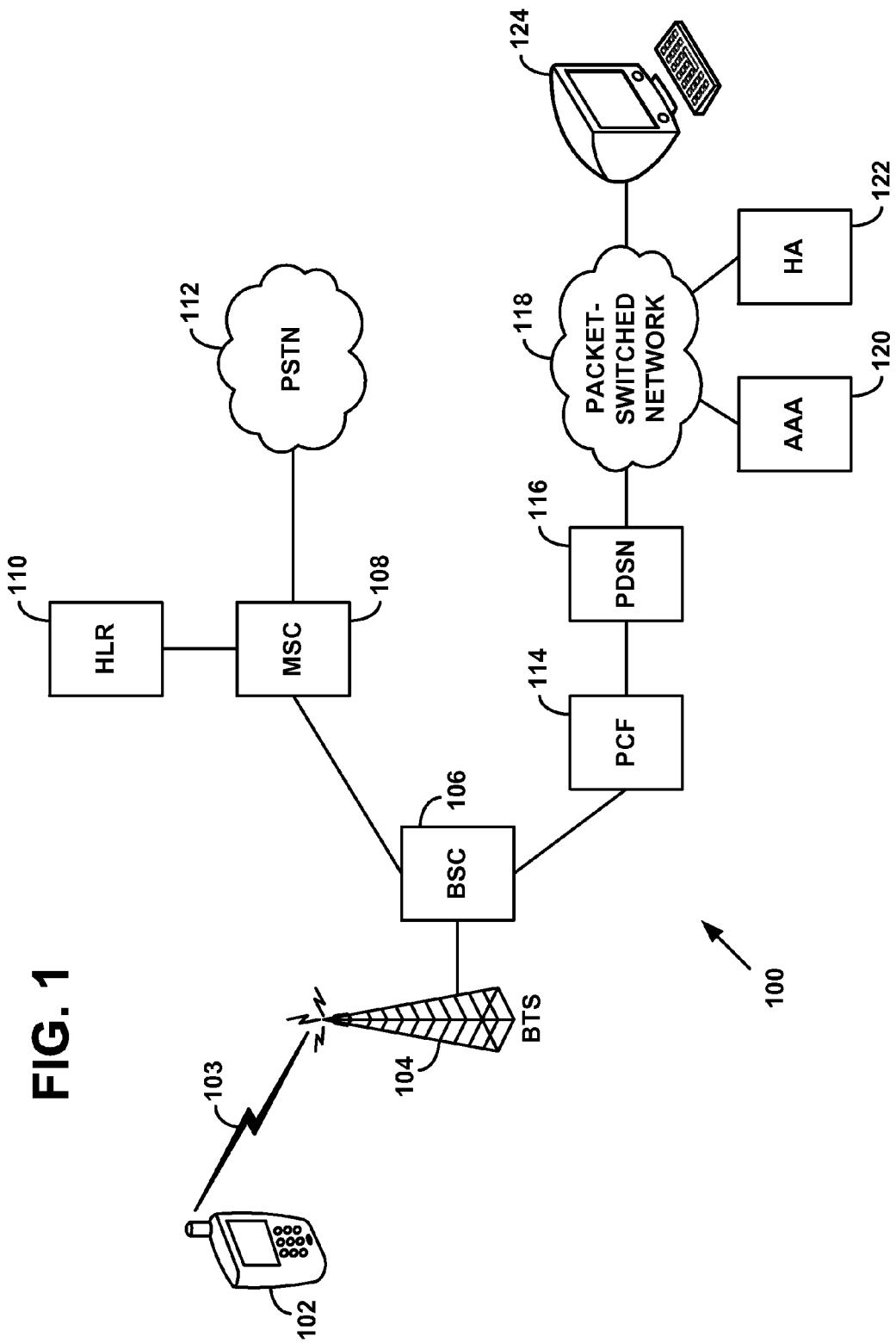
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
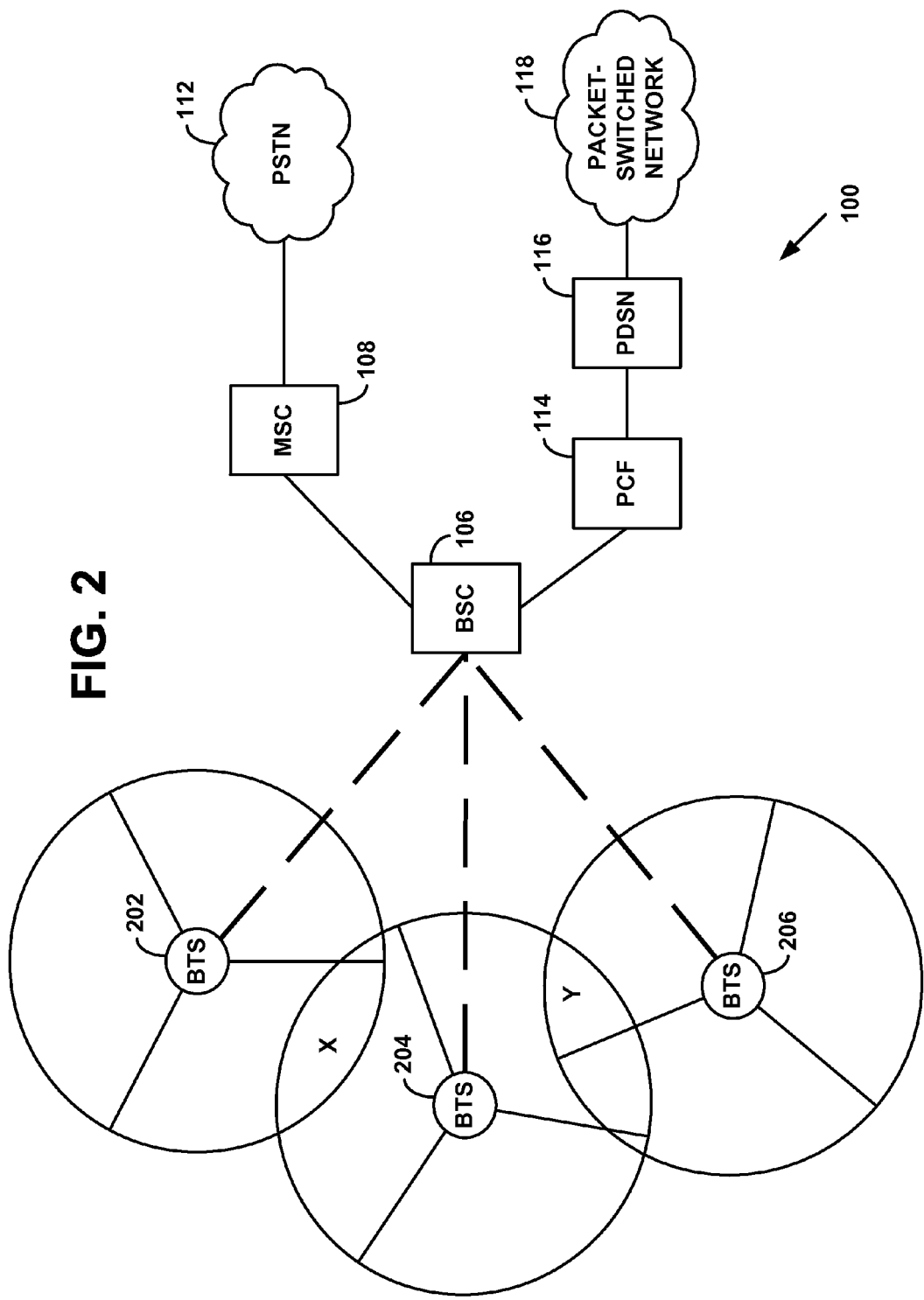
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of wireless coverage areas. This arrangement is illustrated in FIG. 2, which shows BSC 106 in network 100 coupled with BTSs 202, 204, and 206. Each BTS is shown at the core of a respective circle representing a wireless coverage area, and each wireless coverage area is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
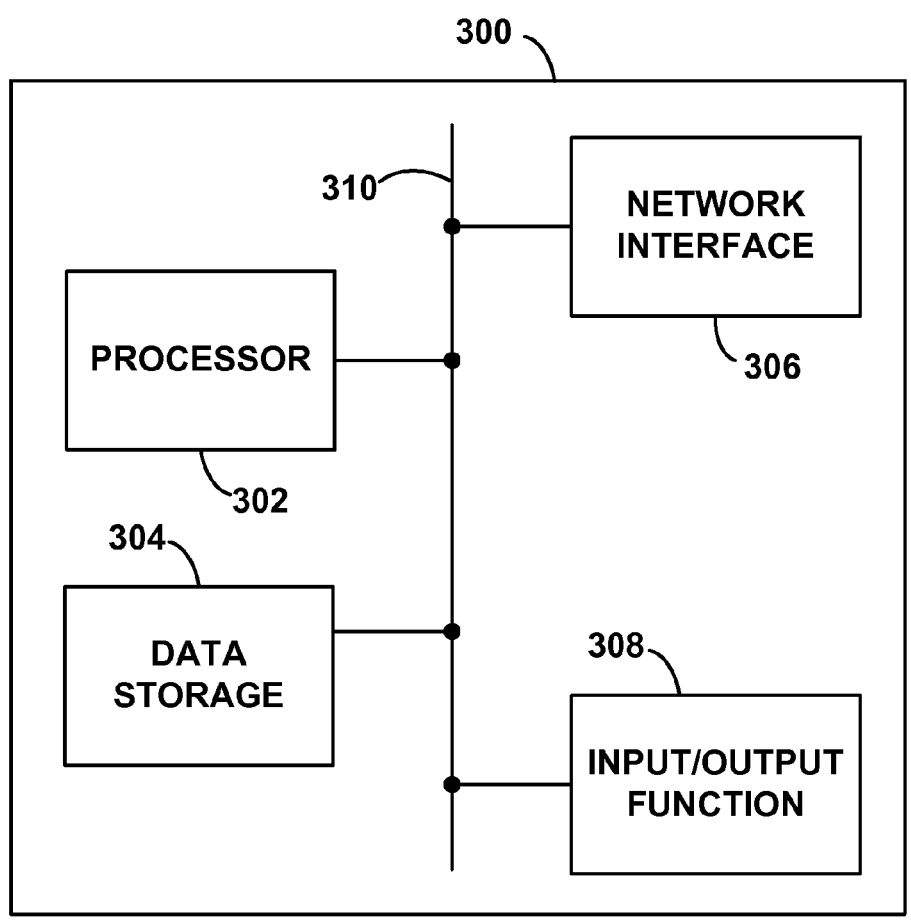
FIG. 3 is a block diagram of a RAN device, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232 or USB port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios are described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

III. Example Media Codecs

As noted above, a media codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

Media codecs may be either lossless or lossy. Lossless media codecs may use an encoding format that allows the encoded media to be decoded back to its original format. Thus, lossless media codecs may support high quality transmission and storage of media.

On the other hand, some media codecs are lossy. Lossy codecs are typically used on media for which some degree of degradation is acceptable. For instance, compact disc audio can be compressed to about 10-20% of its size (i.e., achieving about 80-90% compression) by using an MP3 codec to discard the audio components that are beyond the auditory resolution ability of most individuals. Thus, to most listeners, music encoded in the MP3 format sounds about the same as it would if played directly from the compact disc. Similarly, voice codecs may take advantage of psychoacoustics to remove redundant or less audible components of voice signals, resulting in about 80-90% compression of the voice signal.

In general, different lossy codecs may support different extents of lossy compression (e.g., some codecs will support compression with more loss than other codecs). Some lossy codecs may support multiple extents of lossy compression (e.g., a particular codec may select between two or more rates of lossy compression).

In general, there may be a roughly linear relationship between media codec bit rate and the media quality that the media codec produces at that bit rate. For example, a voice codec operating at 9.6 kilobits per second is likely to produce better quality voice than a voice codec operating at 4.8 kilobits per second. However, as media codec technologies advance, new media codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of media codecs, several different voice codecs are compared and contrasted below. Particularly, CDMA wireless networks may use one or more codecs from the Enhanced Variable Rate Codec (EVRC) family.

For instance, the EVRC-A codec operates on input speech signals sampled with 16-bit resolution 8,000 times per second (e.g., 8,000 Hz). The resulting 128 kilobit per second stream is divided into 20 millisecond frames, each of which is compressed to either 171 bits (8.55 kilobit per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC- A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec supports at least some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB. EVRC-NW may also be referred to as CMDA service option 73.

The media codecs described herein are only examples. Other voice or non-voice codecs may be used instead.

It may be beneficial for the RAN to preferentially allocate wireless coverage area resources to WCDs that are capable of supporting advanced codecs. These advanced codecs may be capable of supporting higher-quality voice calls, perhaps at a lower bit rate. Also, advanced codecs may be capable of supporting more bit rates (e.g., more operating modes) as well as advanced features, such as special encoding for non-speech signals.

Therefore, when deciding whether to allocate a wireless coverage area resource to one of two or more WCDs, the RAN may preferentially allocate the resource to a WCD that supports more advanced media codecs over a WCD that supports less advanced codecs. With regard to the example media codecs discussed above, the RAN may preferentially allocate resources to WCDs that support EVRC-NW over WCDs that support EVRC-WB, WCDs that support EVRC-WB over WCDs that support EVRC-B, and/or WCDs that support EVRC-B over WCDs that support EVRC-A. In this way, the RAN is more likely to provide users with higher quality voice calls, perhaps at lower bit rates and with support for efficient processing of non-speech signals. The RAN may apply this preference to new calls, to calls that are being handed off, or both. For instance, in some embodiments, the RAN may apply this preference when the WCDs contending for the resource are all making new calls or all undergoing handoff procedures. On the other hand, if one WCD is requesting a new call and another WCD is requesting a handoff, the RAN may allocate the resource to the WCD undergoing the handoff (so that this WCD's call is not dropped) or vice-versa (so that initial call failure is avoided).

IV. Example Operations

Figure 4:
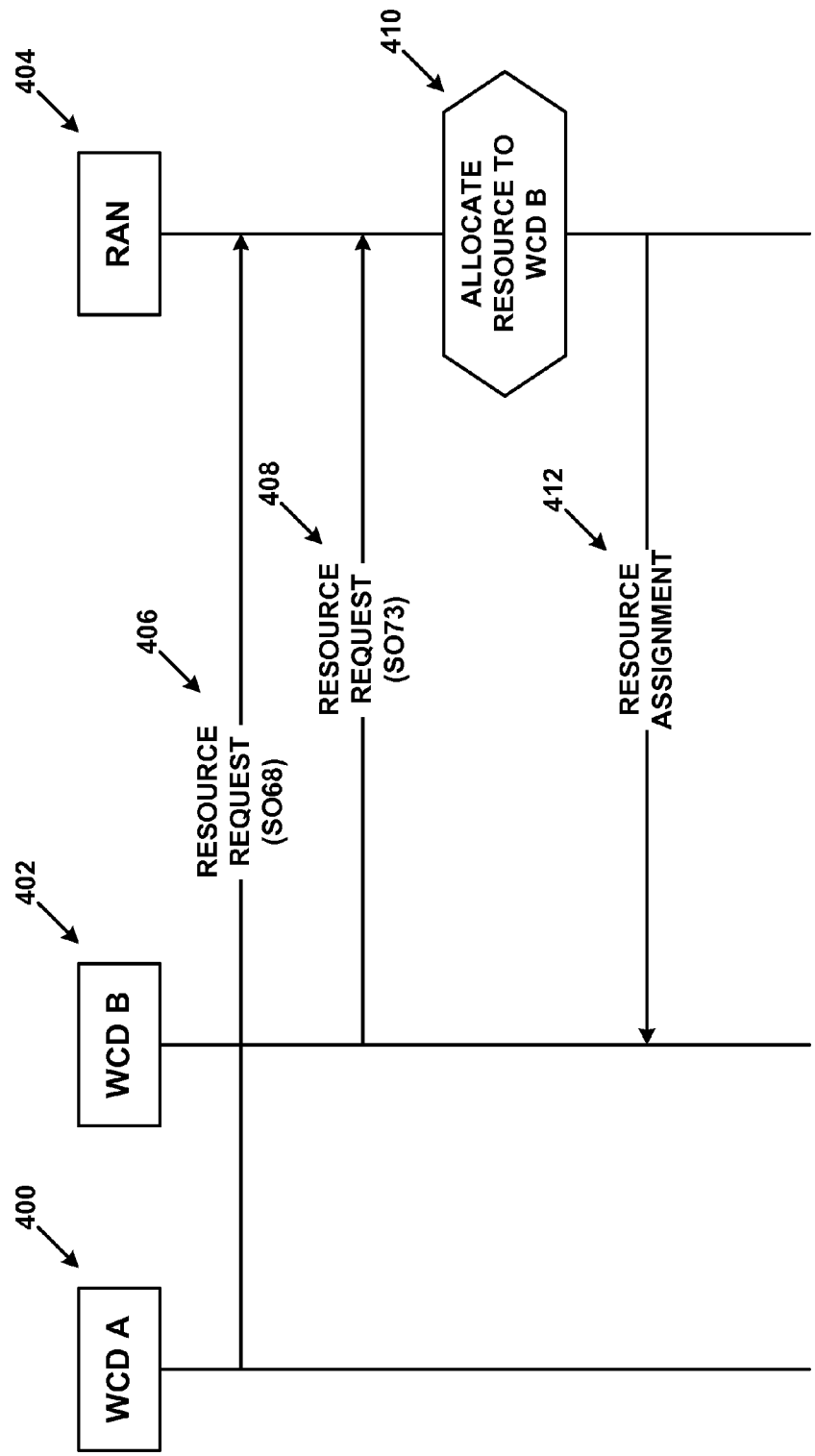
FIG. 4 is a message flow, in accordance with an example embodiment.

FIG. 4 depicts an example message flow that illustrates possible embodiments. The message flow includes WCD A 400 and WCD B 402, both of which are contending for a wireless coverage area resource of RAN 404.

At step 406, WCD A 400 may transmit a resource request to RAN 404. Similarly, at step 408, WCD B 402 may transmit a resource request to RAN 404. Both resource requests may seek allocation of a resource to the respective transmitting WCDs. The resource requests may take various forms, such as an origination message, a probe message, a page response message, or some other type of message.

In FIG. 4, the resource requests contain indications of the respective service options that the WCDs may use if allocated the resource. Thus, the resource request transmitted by WCD A 400 may indicate that WCD A 400 is capable of supporting service option 68 (e.g., EVRC-B), and the resource request transmitted by WCD B 402 may indicate that WCD B 402 is capable of supporting service option 73 (e.g., EVRC-NW). This is one way in which RAN 404 may determine the media codecs supported by each WCD. However, RAN 404 may determine supported media codecs in other ways as well. For instance, RAN 404 may store or have access to information that indicates one or more media codecs supported by each WCD. Alternatively, or additionally, RAN 404 may query each WCD, thus triggering the WCDs to transmit respective lists of one or more supported codecs to RAN 404. This query may occur periodically, from time to time, or in response to receiving the resource requests.

Regardless, at step 410, RAN 404 may allocate a resource to WCD B 402. This allocation may occur in response to RAN 404 determining that WCD A 400 and WCD B 402 are contending for the resource. For instance, the resource may be the only free resource in a particular wireless coverage area. RAN 404 may allocate the resource to WCD B 402 because WCD B 402 supports EVRC-NW, while (as far as the RAN can tell) WCD A 400 only supports EVRC-B. As discussed above, EVRC-NW is likely to be more efficient than EVRC-B, and supports more features. Possibly based on these considerations, RAN 404 may perform the allocation, and, at step 412, transmit a resource assignment to WCD B 402, indicating that WCD B 402 has been allocated the resource.

After receiving resource assignment 412, WCD B 402 may engage in a voice call using the allocated resource and service option 73. RAN 404 may or may not transmit a message to WCD A 400 indicating that the resource has not been assigned to WCD A 400.

Figure 5:
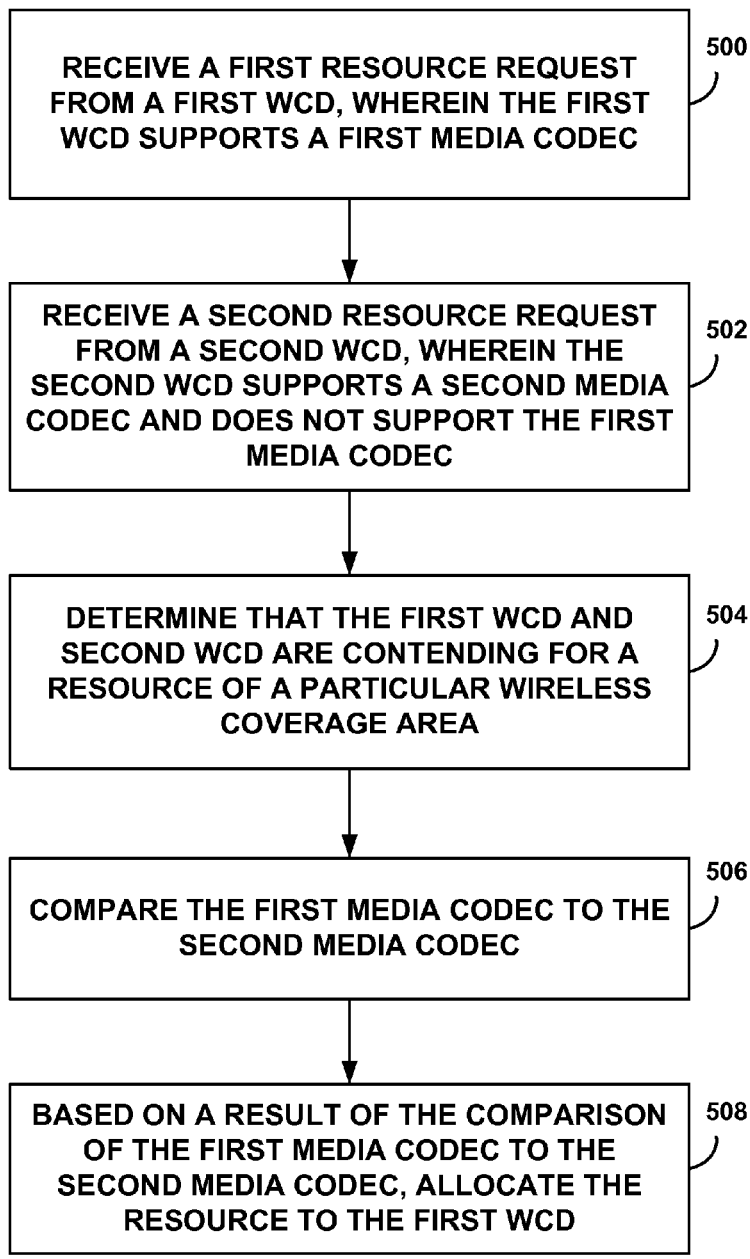
FIG. 5 is a flow chart, in accordance with an example embodiment.

FIG. 5 is a flow chart depicting another example embodiment. One or more steps of FIG. 5 may be carried out by a RAN component exemplified by RAN device 300. At step 500, a RAN may receive a first resource request from a first WCD. The first WCD may support a first media codec. At step 502, the RAN may receive a second resource request from a second WCD. The second WCD may support a second media codec and might not support the first media codec.

At step 504, possibly in response to receiving the first resource request and the second resource request, the RAN may determine that the first WCD and second WCD are contending for a resource of a particular wireless coverage area defined by the RAN. The resource may be, for example, one or more of a CDMA code, a frequency, and a time slot. Alternatively or additionally, the resource may be the only resource of a particular type available in the particular wireless coverage area.

At step 506, possibly in response to determining that the first WCD and second WCD are contending for the resource, the RAN may compare the first media codec to the second media codec. At step 508, perhaps based on a result of the comparison of the first media codec to the second media codec, the RAN may allocate the resource to the first WCD.

After allocating the resource to the first WCD, the RAN may support a voice call between the first WCD and another device, wherein the voice call uses the first media codec.

This comparison may involve determining that the first media codec is capable of producing higher voice quality voice calls than the second media codec. For example, the RAN may determine that the first media codec uses a first sampling rate of over 8000 Hz, and the second media codec uses a second sampling rate of 8000 Hz or less. The RAN may allocate the resource to the first WCD based on the first media codec being capable of producing higher voice quality voice calls than the second media codec.

The comparison may also involve determining that the first media codec is capable of producing higher voice quality voice calls at a lower bit rate than the second media codec. The RAN may allocate the resource to the first WCD also based on the first media codec being capable of producing higher voice quality voice calls at a lower bit rate than the second media codec. Alternatively or additionally, the comparison may involve determining that the first media codec is capable of supporting a larger number or range of bit rates than the second media codec. The RAN may allocate the resource to the first WCD based on the first media codec being capable of supporting a larger number or range of bit rates than the second media codec.

Moreover, the comparison may also include consideration of the signal strength at which the WCD receives signals from the particular wireless coverage area. For instance, the first WCD may receive signals from the particular wireless coverage area at a first signal strength, and the second WCD may receive signals from the particular wireless coverage area at a second signal strength. The RAN may compare the first signal strength to the second signal strength to determine that the first signal strength is greater than the second signal strength. The RAN may allocate the resource to the first WCD also based on the first signal strength being greater than the second signal strength. In some cases, if the first media codec and the second media codec are both a particular media codec (e.g., the same media codec), the RAN may use the outcome of this comparison of signal strengths to determine to which WCD to allocate the resource.

It should be understood that FIGS. 4 and 5 depict non-limiting embodiments. Thus, more or fewer steps than shown in FIGS. 4 and 5 may be used without departing from the scope of the embodiments herein. Additionally, some of these steps may be repeated one or more times, or may be omitted altogether. Further, the message flows and flow charts of these figures may be combined with one another and/or with other aspects described this specification and its accompanying drawings, in whole or in part, also without departing from the scope of the embodiments herein. For instance, any of the additional features discussed in the context of FIG. 4 may also be applied to methods illustrated by the flow chart of FIG. 5.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

V. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
   a radio access network (RAN), receiving a first air interface resource request from a first wireless communication device (WCD);
   the RAN receiving a second air interface resource request from a second WCD, wherein the first WCD and the second WCD are both served by a particular wireless coverage area of the RAN;
   in response to receiving the first air interface resource request and the second air interface resource request, the RAN determining that the first WCD and second WCD are contending for an air interface resource of the particular wireless coverage area and that the air interface resource is the only air interface resource of a particular type available in the particular wireless coverage area;
   in response to determining that the first WCD and second WCD are contending for the air interface resource, the RAN determining that (i) the first WCD supports a first media codec, and (ii) the second WCD supports a second media codec and does not support the first media codec; and
   based on determining that (i) the first WCD supports the first media codec, and (ii) the second WCD supports the second media codec and does not support the first media codec, the RAN allocating the air interface resource to the first WCD.

2. The method of claim 1, wherein the first media codec is capable of producing higher voice quality voice calls than the second media codec, and wherein the RAN allocates the air interface resource to the first WCD also based on the first media codec being capable of producing higher voice quality voice calls than the second media codec.

3. The method of claim 2, wherein the first media codec is capable of producing the higher voice quality voice calls at a lower bit rate than the second media codec, and wherein the RAN allocates the air interface resource to the first WCD also based on the first media codec being capable of producing the higher voice quality voice calls at the lower bit rate than the second media codec.

4. The method of claim 2, wherein the first media codec uses a first sampling rate of over 8000 Hz, and the second media codec uses a second sampling rate 8000 Hz or less.

5. The method of claim 1, wherein the first media codec is capable of supporting a larger number of bit rates than the second media codec, and wherein the RAN allocates the air interface resource to the first WCD also based on the first media codec being capable of supporting the larger number of bit rates than the second media codec.

6. The method of claim 1, wherein the air interface resource comprises a code division multiple access (CDMA) code.

7. The method of claim 1, wherein the first WCD receives signals from the particular wireless coverage area at a first signal strength, and wherein the second WCD receives signals from the particular wireless coverage area at a second signal strength, the method further comprising:

comparing the first signal strength to the second signal strength to determine that the first signal strength is greater than the second signal strength, wherein the RAN allocating the air interface resource to the first WCD is also based on the first signal strength being greater than the second signal strength.

8. The method of claim 7, wherein the first media codec and the second media codec are both a particular type of media codec.

9. The method of claim 1, further comprising:
after allocating the air interface resource to the first WCD, the RAN supporting a voice call between the first WCD and another device, wherein the voice call uses the first media codec.

10. An article of manufacture including a non-transitory computer-readable medium, having stored thereon program instructions that, upon execution by a radio access network (RAN) device, cause the RAN device to perform operations comprising:
receiving a first air interface resource request from a first wireless communication device (WCD);
receiving a second air interface resource request from a second WCD, wherein the first WCD and the second WCD are both served by a particular wireless coverage area of the RAN;
in response to receiving the first air interface resource request and the second air interface resource request, determining that the first WCD and second WCD are contending for an air interface resource of the particular wireless coverage area and that the air interface resource is the only air interface resource of a particular type available in the particular wireless coverage area;
in response to determining that the first WCD and second WCD are contending for the air interface resource, determining that (i) the first WCD supports a first media codec, and (ii) the second WCD supports a second media codec and does not support the first media codec; and
based on determining that (i) the first WCD supports the first media codec, and (ii) the second WCD supports the second media codec and does not support the first media codec, allocating the air interface resource to the first WCD.

11. The article of manufacture of claim 10, wherein the first media codec is capable of producing higher voice quality voice calls than the second media codec, and wherein the RAN device allocates the air interface resource to the first WCD also based on the first media codec being capable of producing higher voice quality voice calls than the second media codec.

12. The article of manufacture of claim 11, wherein the first media codec is capable of producing the higher voice quality voice calls at a lower bit rate than the second media codec, and wherein the RAN device allocates the air interface resource to the first WCD also based on the first media codec being capable of producing the higher voice quality voice calls at the lower bit rate than the second media codec.

13. The article of manufacture of claim 11, wherein the first media codec uses a first sampling rate of over 8000 Hz, and wherein the second media codec uses a second sampling rate 8000 Hz or less.

14. The article of manufacture of claim 10, wherein the first media codec is capable of supporting a larger number of bit rates than the second media codec, and wherein the RAN allocates the air interface resource to the first WCD also based on the first media codec being capable of supporting the larger number of bit rates than the second media codec.

15. The article of manufacture of claim 10, wherein the air interface resource comprises a code division multiple access (CDMA) code.

16. The article of manufacture of claim 10, wherein the first WCD receives signals from the particular wireless coverage area at a first signal strength, and wherein the second WCD receives signals from the particular wireless coverage area at a second signal strength, the operations further comprising:
comparing the first signal strength to the second signal strength to determine that the first signal strength is greater than the second signal strength, wherein allocating the air interface resource to the first WCD is also based on the first signal strength being greater than the second signal strength.

17. The article of manufacture of claim 16, wherein the first media codec and the second media codec are both a particular type of media codec.

18. The article of manufacture of claim 10, the operations further comprising:
after allocating the air interface resource to the first WCD, supporting a voice call between the first WCD and another device, wherein the voice call uses the first media codec.

* * * * *